US012596635B2

(12) United States Patent  (10) Patent No.:   US 12,596,635 B2

Hu et al.  (45) Date of Patent:        Apr. 7, 2026

(54) BLACK-BOX FUZZING TESTING METHOD AND APPARATUS

(71) Applicant: SAMSUNG ELECTRONICS CO., LTD., Suwon-si (KR)

(72) Inventors: Haitao Hu, Shaanxi (CN); Zhu Fu, Shaanxi (CN); Huan Guo, Shaanxi (CN); Hao Yan, Shaanxi (CN); Zhenan Tang, Shaanxi (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 18/320,142

(22) Filed: May 18, 2023

(65) Prior Publication Data

US 2024/0134781 A1   Apr. 25, 2024
US 2024/0232059 A9   Jul. 11, 2024

(30) Foreign Application Priority Data

Oct. 24, 2022   (CN) .......................... 202211301975.9

(51) Int. Cl.
*G06F 9/44*          (2018.01)
*G06F 11/3668*       (2025.01)

(52) U.S. Cl.
CPC ...... *G06F 11/3684* (2013.01); *G06F 11/3676* (2013.01); *G06F 11/3688* (2013.01)

(58) Field of Classification Search
CPC ............. G06F 11/3684; G06F 11/3676; G06F 11/3688
See application file for complete search history.

(56) References Cited

U.S. PATENT DOCUMENTS

| | | | |
|---|---|---|---|
| 6,704,933 B1 * | 3/2004 | Tanaka ................... | H04N 7/163 |
| | | | 725/132 |
| 8,417,998 B2 | 4/2013 | Thomas et al. | |
| 10,599,540 B2 | 3/2020 | Choi et al. | |
| 2011/0302455 A1 | 12/2011 | Thomas et al. | |
| 2015/0186251 A1 * | 7/2015 | Friedler .............. | G06F 11/3688 |
| | | | 717/124 |
| 2015/0269061 A1 * | 9/2015 | Li ........................ | G06F 11/3608 |
| | | | 717/131 |
| 2017/0068609 A1 * | 3/2017 | Chavez .............. | G06F 11/3644 |
| 2019/0213115 A1 * | 7/2019 | Takawale ............ | G06F 11/3692 |
| 2019/0317882 A1 * | 10/2019 | Li ........................ | G06F 11/3688 |

(Continued)

FOREIGN PATENT DOCUMENTS

| | | |
|---|---|---|
| CN | 109992507 | 7/2019 |
| CN | 107423217 | 2/2020 |

(Continued)

OTHER PUBLICATIONS

Jun Li, et al., "Fuzzing: a survey", Cybersecurity (2018) 1:6.

*Primary Examiner* — Bradley A Teets
*Assistant Examiner* — Lenin Paulino
(74) *Attorney, Agent, or Firm* — Morgan, Lewis & Bockius LLP

(57)                ABSTRACT

A black-box fuzzing testing method includes: generating a plurality of testcases; executing a target program based on each of the generated testcases to obtain a plurality of execution results; determining a plurality of execution paths of the target program using the execution results; and determining a code coverage of the target program from the execution paths.

16 Claims, 3 Drawing Sheets

(56)    References Cited

U.S. PATENT DOCUMENTS

| | | | | |
|---|---|---|---|---|
| 2021/0318947 A1* | 10/2021 | Wu | ..................... | G06F 11/3692 |
| 2023/0038605 A1* | 2/2023 | Zaitsau | .................. | G11C 29/38 |
| 2023/0289282 A1* | 9/2023 | Khafizov | ........... | G06F 11/3688 |
| 2023/0367693 A1* | 11/2023 | Krupashankar | ..... | G06F 11/3688 |

FOREIGN PATENT DOCUMENTS

| | | |
|---|---|---|
| CN | 112395146 | 2/2021 |
| CN | 113472739 | 10/2021 |

* cited by examiner

BLACK-BOX FUZZING TESTING METHOD AND APPARATUS

CROSS-REFERENCE TO RELATED APPLICATION

This application claims priority under 35 U.S.C § 119 to Chinese Patent Application No. 202211301975.9, filed on Oct. 24, 2022, the disclosure of which is incorporated by reference in its entirety herein.

TECHNICAL FIELD

The present application relates to the field of software testing, and more particularly, relates to a black-box fuzzing testing method and apparatus.

DISCUSSION OF RELATED ART

Black-box fuzzing test is a technology of testing a test target (such as, a program) as a black box without considering its internal architecture. The basic idea of the black-box fuzzing test is to take a set of random data as an input to the test target and monitor any abnormality during execution of the test target, and further locate defects in the test target by recording the input data that caused the abnormality.

However, existing black-box fuzzing tests have a large number of redundant testcases, provide no code coverage, and do not support generation of new testcases, thereby resulting in low testing efficiency.

SUMMARY

According to an exemplary embodiment of the present disclosure, there is provided a black-box fuzzing testing method, comprising: generating a plurality of testcases; executing a target program based on each of the generated testcases to obtain a plurality of execution results; determining a plurality of execution paths of the target program using the execution results; and determining a code coverage of the target program from the execution paths.

The black-box fuzzing testing method may further include: determining whether an execution path of the plurality of execution paths associated with a given testcase among the testcases is a new execution path, based on previously executed paths recorded in a path library; recording the first execution path into the path library if it is determined that the first execution path is the new execution path; and determining the test coverage of the target program based on the number of the paths recorded in the path library and a preset test path number.

The determining whether the first execution path is a new execution path may comprise: determining whether there is an execution path having the same execution result as the first execution path in the path library; determining the first execution path as the new path execution path if it is determined there is no execution path having the same execution result.

The black-box fuzzing testing method may further comprise: mutating the given testcase to generate new testcases for testing the target program if the first execution path is determined to be a new execution path; and recording an association relationship between the given testcase and the new testcases in a testcase relationship table.

The path library may further include testcases corresponding to each of the execution paths, and the determining whether the first execution path is a new execution path may further comprises: determining whether there is a second execution path having the same execution result as the first execution path in the path library; determining whether the given testcase has an association relationship with testcases corresponding to the second execution path based on the testcase relationship table and the path library if it is determined that the second execution path has the same execution result as the first execution path; and determining the first execution path to be the new execution path when it is determined the given test case has no association relationship.

The black-box fuzzing testing method may further comprise: determining whether the given testcase has been mutated a preset number of times when it is determined that the first execution path is not a new execution path; and mutating the given testcase to generate the new testcases for testing the target program if it is determined that given testcase has not been mutated the preset number of time.

The determining whether the first execution path is a new execution path may comprise: determining the first execution path as a new execution path if one of: a) a return value of the execution result is a new value; b) the return value is not a new value, and an execution time of the execution result falls into a new time period; c) the return value is not a new value, the execution time does not fall into a new time period, and return data of the execution result is new data; d) the return value is not a new value, the execution time does not fall into a new time period, the return data is not new data, and a state of the target program is a new state; and e) the return value is not a new value, the execution time does not fall into a new time period, the return data is not new data, the state of the test target is not a new state, and the generated testcase does not have an association relationship with testcases corresponding to the first execution path.

Before the executing the target program based on each of the generated testcases to obtain the execution results, the black-box fuzzing testing method may further comprise: randomly creating testcases for the target program; and performing redundancy filtering on randomly created testcases to generate the plurality of testcases.

The target program may be solid state drive (SSD) firmware.

According to an exemplary embodiment of the present disclosure, there is provided a black-box fuzzing testing apparatus, comprising: a testcase execution unit configured to generate a plurality of testcases and execute a target program based on the generated testcases to obtain execution results; a path management unit configured to determine, using the execution results, a plurality of execution paths of the target program; and a feedback management unit configured to determine a code coverage of the target program from the execution paths.

The path management unit may further be configured to: determine whether a first execution path of the execution paths associated with a given testcase among the testcases is a new execution path, based on previously executed paths recorded in a path library; and if it is a new path, record the first execution path into the path library, wherein feedback management unit is configured to determine the test coverage of the target program based on the number of the execution paths recorded in the path library and a preset test path number.

The path management unit may further be configured to: determine whether there is an execution path having the same execution result as the first execution path in the path library; and determine the first execution path as a new execution path if it is determined there is no execution path having the same execution result.

The black-box fuzzing testing apparatus may further comprise: a testcase generation unit configured to mutate the given testcase to generate new testcases for testing the target program if the first execution path is determined to be a new execution path; and a testcase management unit configured to record an association relationship between the given testcase and the new testcases in a testcase relationship table.

The path library may further comprise testcases corresponding to each of the execution paths, and the path management unit may further be configured to: determine whether there is a second execution path having the same execution result as the first execution path in the path library; determine whether the given testcase has an association relationship with testcases corresponding to the second execution path based on the testcase relationship table and the path library if it is determined that the second execution path has the same execution result as the first execution path; and determine the first execution path to be a new execution path when it is determined the given test case has no association relationship.

The testcase generation unit may further be configured to, determine whether the given testcase has been mutated a preset number of times when it is determined that the first execution path is not a new execution path; and mutate the given testcase to generate new testcases for testing the target program if it is determined that given testcase has not been mutated the preset number of times.

The path management unit may further be configured to: determine the first execution path as a new path if one of: a) a return value of the execution result is a new value; b) the return value is not a new value, and an execution time of the execution result falls into a new time period; c) the return value is not a new value, the execution time does not fall into a new time period, and return data of the execution is new data; d) the return value is not a new value, the execution time does not fall into a new time period, the return data is not new data, and a state of the test target is a new state; and e) the return value is not a new value, the execution time does not fall into a new time period, the return data is not new data, the state of the test target is not a new state, and the generated testcase does not have an association relationship with testcases corresponding to the first execution path.

The testcase management unit may further be configured to randomly create testcases for the target program and perform redundancy filtering on the randomly created testcases to generate the testcases.

The target program may be solid state drive (SSD) firmware.

According to an exemplary embodiment of the present disclosure, there is provided an electronic device, including a memory on which computer executable instructions are stored and a processor executing the previous method when the instructions are executed by the processor.

According to an exemplary embodiment of the present disclosure, there is provided a computer-readable medium on which computer executable instructions are stored, the previous method is executed when the instructions are executed.

According to an exemplary embodiment of the present disclosure, there is provided a black-box fuzzing testing method, comprising: generating a plurality of testcases; executing a target program based on each of the generated testcases to obtain a return value and an execution time for each of the generated testcases; filtering out at least one of the generated test cases based on the return value and the execution time for each of the generated cases to generate a subset of testcases; and determining a code coverage of the target program based on the subset of test cases. The filtering may include filtering out one of the generated testcases whose return value and execution time is the same as another one of the generated testcases.

According to an exemplary embodiment of the present disclosure, generation of new testcases may be guided based on whether the testcase generates a new path, which avoids occurrence of situation of a large number of redundant testcases caused by random generation of testcases, and improves a code coverage at the same time. The code coverage of the test target may be determined based on the total number of paths of the current test target and the number of new paths that have been discovered. In addition, embodiments of the present disclosure may also be applied to the black-box fuzzing testing of SSD firmware.

BRIEF DESCRIPTION OF THE DRAWINGS

The above and other features of the inventive concept will become more apparent from the following detailed description, taken in conjunction with the accompanying drawings in which.

DETAILED DESCRIPTION OF EXEMPLARY EMBODIMENTS

Figure 1:
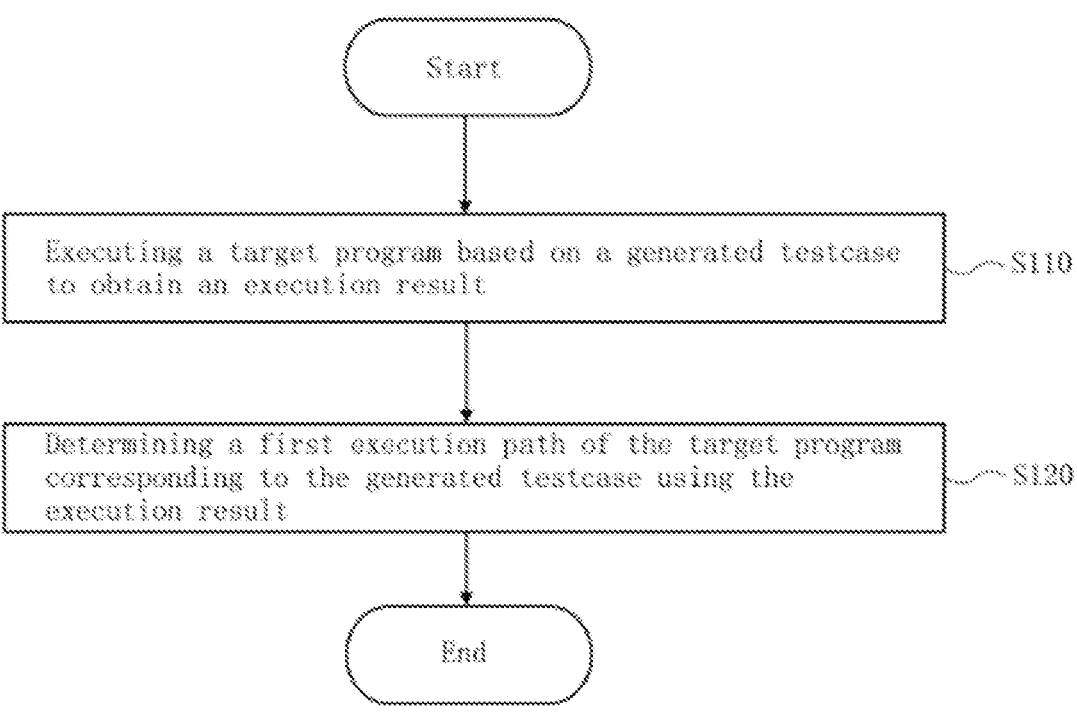
FIG. 1 is a flowchart illustrating a black-box fuzzing testing method according to an exemplary embodiment of the present disclosure.

Exemplary embodiments of the present disclosure will be described more fully hereinafter with reference to the accompanying drawings. Line reference numerals may refer to like elements throughout the accompanying drawings.

FIG. 1 is a flowchart illustrating a black-box fuzzing testing method according to an exemplary embodiment of the present disclosure.

In step S110, a target program is executed based on a generated testcase to obtain an execution result. In an embodiment, the execution result includes at least one of a return value, return data, execution time of the target program and a state of the target program. In an embodiment, the target program is firmware stored on an SSD. For example, the testcase could be inputting certain data to the target program.

In step S120, a first execution path of the target program corresponding to the generated testcase is determined using the execution result.

The black-box fuzzing testing method according to an exemplary embodiment of the present disclosure illustrated in FIG. 1 will be described in more details below with reference to FIG. 2.

Figure 2:
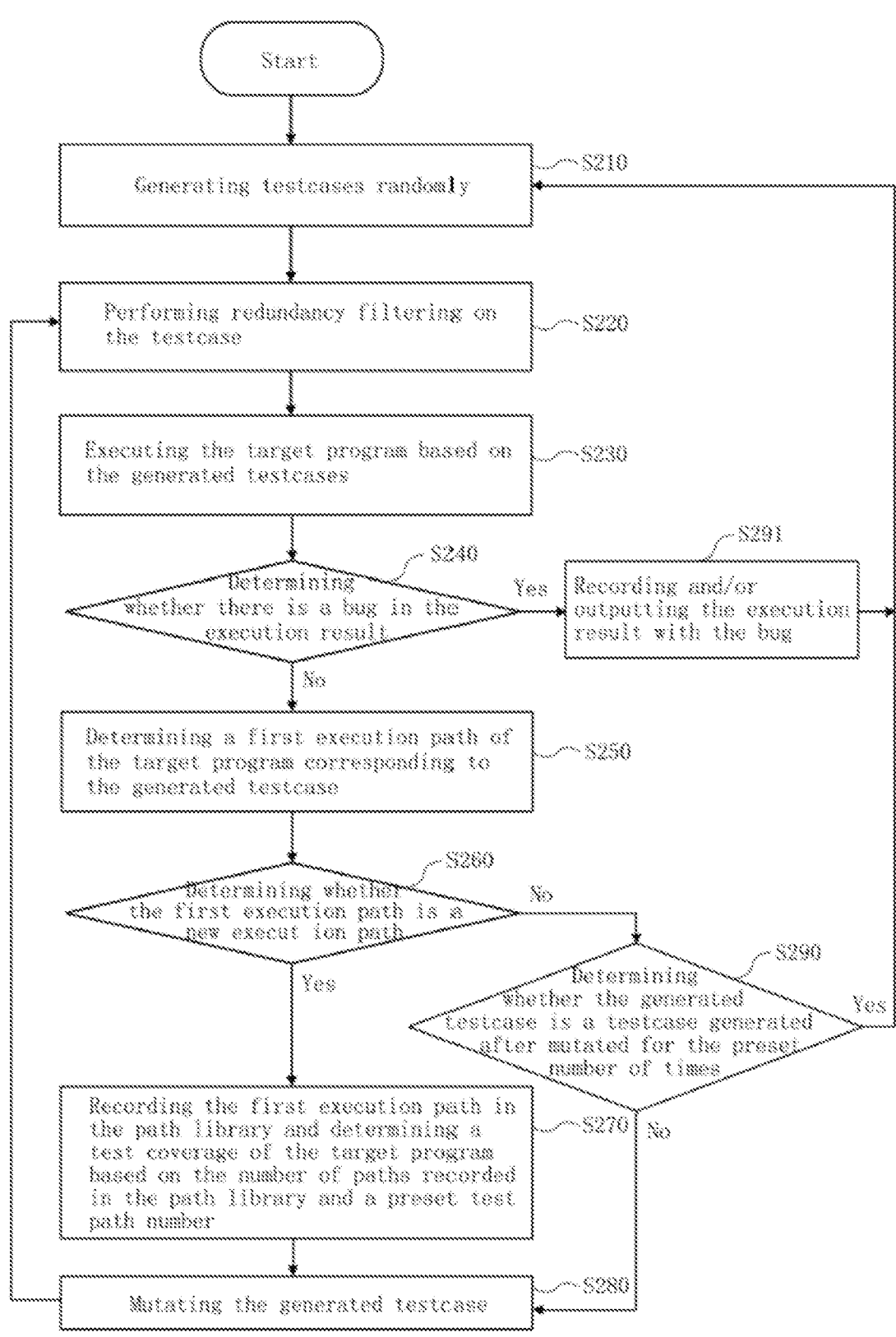
FIG. 2 is a detailed flowchart illustrating the black-box fuzzing testing method according to an exemplary embodiment of the present disclosure.

FIG. 2 is a detailed flowchart illustrating the black-box fuzzing testing method according to an exemplary embodiment of the present disclosure.

Referring to FIG. 2, in step S210, testcases is randomly generated. Here, the testcase may be randomly generated based on an existing testcase generating method.

In step S220, before executing the target program based on the generated testcase to obtain the execution result, redundancy filtering is performed on the testcases to remove or filter out a repeated testcase. Here, the filtered out testcase can be stored in a testcase pool for filtering out new testcases generated subsequently. Only as an example rather than a limitation, the redundancy filtering may be performed on the testcase based on predetermined conditions, wherein the predetermined conditions may include at least one of the testcases being different, the testcases being complete, and the testcases being evenly distributed. In addition, the testcases may be recorded in the testcase pool in forms of masks, discrete values, continuous values, arrays, etc.

When some of the generated testcases are repeated, a condition that all generated testcases be unique will not be satisfied. Further, when two testcases differ from one another, but they cause the same or similar result, one of the two testcase may be removed. In addition, the generated testcase may be incomplete or cannot be executed, such as, values of the generated testcase may lead to missing and incomplete data, which will result in malformed data. Thus, such testcases also need to be removed. Besides, one may also set predetermined rules to filter out a generated testcase purposefully. As an example of purposefully filtering out the generated testcase, the generated testcase may obey a certain distribution (such as a binomial distribution), so that the generated testcases are filtered to achieve an even distribution or expected distribution. As another example of purposefully filtering the generated testcase, the generated testcase may produce relatively single results. If each parameter or data in the testcases is expected to cause multiple changes, these relatively single testcases may be removed. As another example, one may make adjustments according to test purpose, such as, if a testcase with a data volume of less than 1M is expected, testcases with a data volume of more than 1M may be filtered, etc.

In addition, after filtering out the testcases, the filtered testcases (e.g., the remaining testcases) may also be sorted based on a predetermined priority, and then in step S230, the target program is executed according to the filtered testcases in a sorted sequence. Here, only as an example rather than a limitation, the filtered testcases may be sorted according to a priority in which a return value>execution time>return data>state of the test target>association of the testcases obtained by executing the target program based on the testcases, wherein the return value, the execution time, the return data, the state of the test target, and the association of the testcases may be the return value, the execution time, the return data, the state of the test target, and the association of the testcases obtained by executing the target program based on testcases previously.

In step S230, the target program is executed based on the generated testcases to obtain the execution result. For example, the target program may be executed using each one of the testcases that remain after the redundance filtering was performed in step S220. In an embodiment, the execution result includes at least one of a return value, return data, execution time of the target program and a state of the target program. Here, the testcases may be encapsulated and input into the target program, and the execution result may be collected after executing the target program. For example, encapsulating the testcases may mean that the testcases are encrypted to generate encrypted data that is input to the target program. Only as an example rather than a limitation, the execution result may include at least one of a return value (which may indicate whether the target program is successfully executed or returns a bug type), execution time, return data and a state of the target program, wherein the target program may be SSD firmware. For example, the bug type may indicate a type of error encountered.

In step S240, whether there is a bug in the execution result is determined. For example, a bug may be determined when the target program does not execute successfully using one of the test cases.

When there is no bug in the execution result, in step S250, a first execution path of the target program corresponding to the generated testcase is determined using the execution result.

Figure 3:
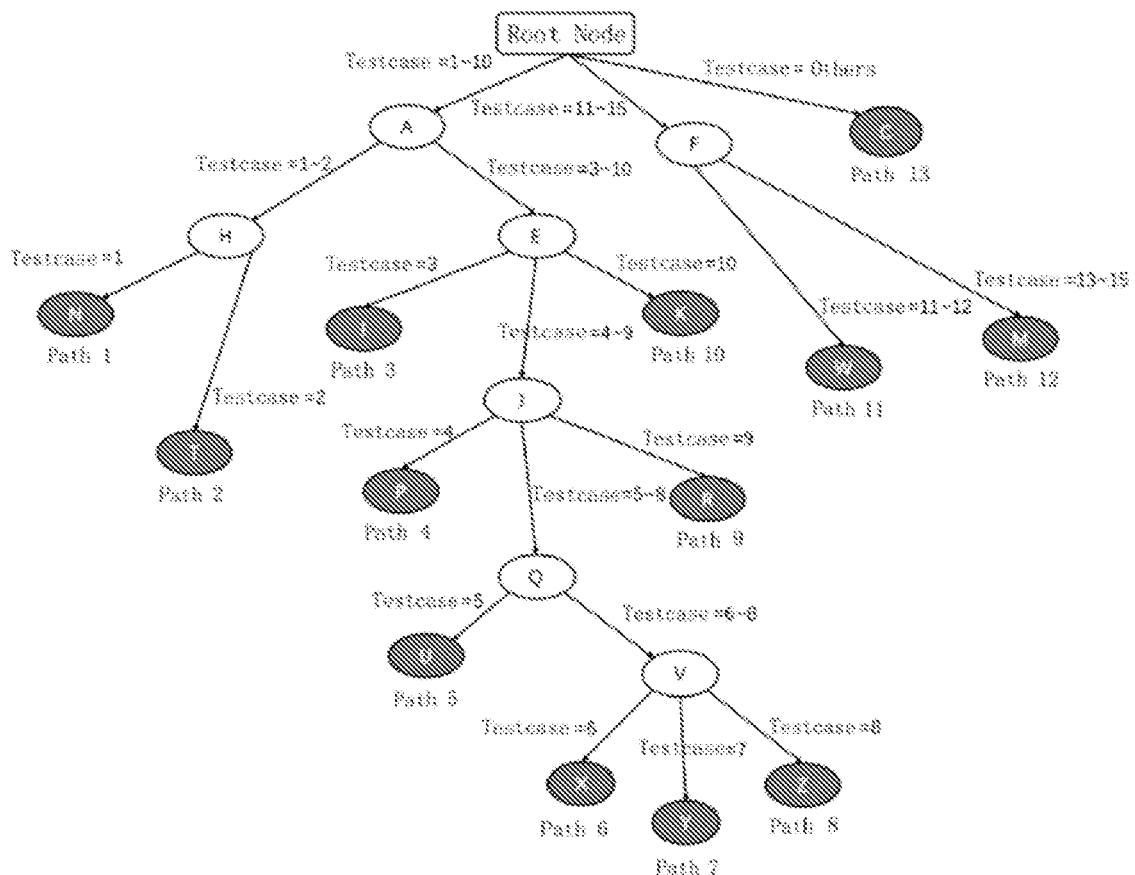
FIG. 3 is a schematic diagram illustrating path generation of a target program according to an exemplary embodiment of the present disclosure.

Subsequently, in step S260, whether the first execution path is a new execution path is determined. For example, it may be determined whether the first execution path is a new execution path based on already executed paths recorded in a path library. FIG. 3 illustrates examples of the execution paths.

For example, it may be determined whether there is a path having the same execution result as the first execution path in the path library, If there is no path having the same execution result, the first execution path may be determined as a new path. In addition, whether there is a second execution path having the same execution result as the first execution path in the path library may also be determined. If there is a second execution path having the same execution result as the first execution path, it may be determined whether the generated testcase has an association relationship with testcases corresponding to the second execution path based on a testcase relationship table (for recording an association relationship between the generated testcase and new testcases) and the path library. If there is no association relationship, the first execution path is a new path. Here, the path library may include a testcase corresponding to each execution path. Only as an example rather than a limitation, a correspondence relationship between testcases and paths may be recorded in the path library in forms of mask ranges, orphan values, etc.

According to an exemplary embodiment of the present disclosure, when the return value is a new value, the first execution path may be determined as a new path. When the return value is not a new value, whether the first execution path is determined as a new path may be determined based on whether the execution time falls into a new time period. For example, the time may be divided into slices to generate multiple time periods. Testcases that provide a return value that is not a new value but within different time periods may belong to different paths. Thus, whether the testcases belong to different paths may be determined through both the return value and the execution time. For a certain time period, if any execution time falls into this certain time period, this certain time period may be marked to indicate that there is already a testcase under this return value whose execution time falls into this time period. A return value may have multiple time periods, where some of the multiple time periods are marked, and the rest of the multiple time periods are not marked. No mark means that no testcase generates this return value and the execution time falls into this time period. When the execution time falls into a new time period, the first execution path may be determined as a new path.

When the execution time does not fall into a new time period, whether the return data is new data may be determined. When the return data is new data, the first execution path may be determined as a new path. When the return data is not new data, whether the first execution path is determined as a new path may be determined based on whether a state of the target program is in a new state. For example, the state may be a state of the SSD (such as initialized, hibernated, connected, ready, working, etc.), or a state of a smart-log (such as, overheating, read-only state, low capacity, power-off protection, etc.), etc.).

When the state of the test target is a new state, the first execution path may be determined as a new path. When the state of the target program is not in a new state, whether the generated testcase has an association relationship with testcases corresponding to the first execution path may be determined. When the generated testcase does not have an association relationship with the testcases corresponding to the first execution path, the first execution path may be determined as a new path. Here, the determining whether the generated testcase has an association relationship with testcases corresponding to the first execution path may further include: determining whether the testcase and other testcases corresponding to the first execution path belong to the same testcase group. When the testcase and the other testcases corresponding to the first execution path do not belong to the same testcase group, the first execution path may be determined as a new path. When the testcase and the other testcases corresponding to the first execution path belong to the same testcase group, whether the testcase and testcases in different testcase groups belong to the first execution path jointly may be determined. When the testcase and the testcases in different testcase groups belong to the first execution path jointly, the first execution path may be determined as a new path, wherein new testcases generated based on the same testcase may be divided into one testcase group.

That is to say, the first execution path may be determined as a new path if the execution result satisfies any one of the following conditions: the return value (e.g., the value to determine whether there is a new path) is a new value; the return value is not a new value, and the execution time falls into a new time period; the return value is not a new value, the execution time does not fall into a new time period, and the return data (e.g., generated value at the end of execution) is new data; the return value is not a new value, the execution time does not fall into a new time period, the return data is not new data, and the state of the test target is a new state; and the return value is not a new value, the execution time does not fall into a new time period, the return data is not new data, the state of the test target is not a new state, and the generated testcase does not have an association relationship with testcases corresponding to the first execution path. In addition to the above situations, the testcase may be determined not to generate a new path.

Subsequently, new testcases may be generated based on whether the testcase generates a new path. More particularly, when the first execution path is a new path, in step S270, the first execution path may be recorded in the path library, and a test coverage of the target program may be determined based on the number of paths recorded in the path library and a preset test path number. For example, each time a unique path is recorded for a target program in the path library, a count in the path library associated with the target program may be incremented. The count may be divided by the preset test path number to determine code coverage of the target program.

In step S280, the generated testcase is mutated to generate new testcases for testing the target program. An association relationship between the generated testcase and the new testcases may be recorded in a testcase relationship table.

A schematic representation of each logic block of the target program, time consumed by passing each branch and a return value of each branch may be obtained according to the execution of the target program, so as to obtain a schematic diagram of path generation of the target program. FIG. 3 is a schematic diagram illustrating path generation of a target program according to an exemplary embodiment of the present disclosure. Referring to FIG. 3, each leaf node represents a new path. If there is a newly generated path, it is added to a corresponding node, and an increase of the path may feedback an increase of the test coverage. Therefore, the test coverage may be determined based on the number of the recorded new paths in step S270. More particularly, assuming that the total number of paths is X (e.g., a positive integer), and the number of recorded paths is N (e.g., a positive integer), the current test coverage is N/X. If the number of new paths is M (e.g., a positive integer), the new test coverage is $$\frac{N+M}{X},$$

and the test coverage is increased by M/X. The test coverage may be used to assess a degree of black-box fuzzing testing. Here, X may be set by those skilled in the art according to needs.

In addition, when the first execution path is not a new path, in step S290, whether the generated testcase is a testcase generated after being mutated a preset number of times may be determined. When the preset number of times is not reached, step S280 may be executed to mutate the generated testcase to generate new testcases for testing the target program and meanwhile also recording an association relationship between the generated testcase and the new testcases in the testcase relationship table. When the preset number of times is reached (it means that the tests of the current path have been saturated), it may return to step S210 to randomly generate a new testcase. For example, if an execution path of a test case is not a new test case and the test case has been mutated the preset number of times, the method may resume to step S210.

After the new testcase is generated in step S280, the new testcase may be used in step S220 to repeat the process until no new testcase can generate a new path, or no operation may be performed either, which may be selected according to actual situations.

In addition, when it is determined in step S240 that there is a bug in the execution result, in step S291, the execution result with the bug may be recorded and/or output, and the method may resume to step S210 to randomly generate a testcase again, or no operation is performed either, which may be selected according to actual situations.

It should be understood that the steps in the detailed flowchart illustrating the black-box fuzzing testing method according to an exemplary embodiment of the present disclosure in FIG. 2 which are different from those in FIG. 1 may not always been present or may not be present in the sequence shown. For example, some steps of FIG. 2 may be adjusted or deleted, and additional steps may be added according to actual needs. For example, steps S220, S240, etc. may be optional steps, which may be added or deleted by according to actual needs. For example, steps S270 and S280 may be executed in an order that differs from that illustrated in FIG. 2.

Figure 4:
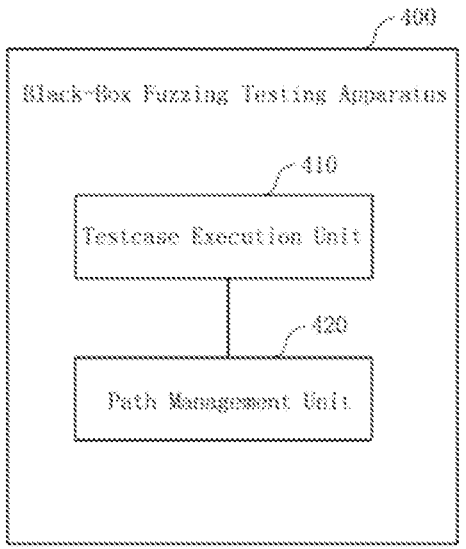
FIG. 4 is a block diagram illustrating a black-box fuzzing testing apparatus according to an exemplary embodiment of the present disclosure.

FIG. 4 is a block diagram illustrating a black-box fuzzing testing apparatus according to an exemplary embodiment of the present disclosure.

Referring to FIG. 4, the black-box fuzzing testing apparatus 400 according to an exemplary embodiment of the present disclosure may include a testcase execution unit 410 and a path management unit 420. The testcase execution unit 410 and a path management unit 420 may be processors.

The testcase execution unit 410 may execute a target program based on a generated testcase to obtain an execution result. In an embodiment, the execution result includes at least one of a return value, return data, execution time of the target program and a state of a test target. Here, the testcase execution unit 410 may encapsulate the testcase and input the same into the target program, and collect the execution result after executing the target program. The target program may be SSD firmware, but is not limited thereto. For example, the encapsulate of the testcase may encrypt the testcase to generate encrypted data and the target program may operate on the encrypted data. In addition, the testcase execution unit 410 may record the execution result when there is a bug in the execution result.

The path management unit 420 may determine a first execution path of the target program corresponding to the generated testcase using the execution result. For example, the path management unit 420 may determine the first execution path of the target program corresponding to the generated testcase using the execution result, when there is no bug in the execution result.

In addition, the path management unit 420 may determine whether the first execution path is a new execution path, based on already executed paths recorded in a path library, and if it is a new path, record the first execution path into the path library.

In addition, the black-box fuzzing testing apparatus 400 may further include: a feedback management unit configured to determine a test coverage of the target program based on the number of paths recorded in the path library and a preset test path number. The feedback management unit may be a processor or a program executable by the processor. More particularly, assuming that the total number of paths is X (e.g., a positive integer), and the number of recorded paths is N (e.g., a positive integer), the current test coverage is N/X. If the number of new paths is M (e.g., a positive integer), the new test coverage is $$\frac{N+M}{X},$$

and the test coverage is increased by M/X. The test coverage may be used to assess a degree of black-box fuzzing testing. Here, X may be set by those skilled in the art according to needs. In addition, the feedback management unit may further include a testcase and path mapping table for mapping and recording testcases and paths based on a testcase association management table and a path management table. For example, the testcase and path mapping table may record in forms of mask ranges, orphan values, etc.

Here, the path management unit 420 may determine whether there is a path having the same execution result as the first execution path in the path library, and if no, determine the first execution path as a new path. For example, the new path may be generated based on a return value and an execution time. According to the case run information, the return value may be first judged. If the return value is new, then the case generates a new path. If the return value is not new, the case execution time is judged. If the time period of the execution time in a range of the return value is empty, this may indicate that the case generates a new path. Some cases will return data at the end of execution. According to the return data characteristics and the current judgement of the path, one can determine whether there is a new path.

In addition, the black-box fuzzing testing apparatus 400 may further include: a testcase generation unit configured to, if the first execution path is a new path, mutate the generated testcase to generate new testcases for testing the target program; and a testcase management unit to perform redundancy filtering on a randomly generated testcase before executing the target program based on the generated testcase to obtain the execution result to remove a repeated testcase. For example, the redundancy filtering may be performed on the testcase based on predetermined conditions, wherein the predetermined conditions may include at least one of the testcases being different, the testcases being complete, and the testcases being evenly distributed. Correspondingly, the testcase execution unit 410 may execute the target program based on the filtered testcase. For example, testcase execution unit 410 may execute the target program on a testcase that was not filtered out by the redundancy filtering.

The testcase management unit may also store the filtered testcase in a testcase pool included in the testcase management unit for filtering out new testcases. In addition, the testcase management unit may also be used to record an association relationship between the generated testcase and the new testcases into the testcase relationship table, and may store the association relationship into the testcase association management table included in the testcase management unit. The testcase association management table may be used to record testcases and their association relationships, that is, which testcases the testcases are mutated from and which testcases the testcases are mutated into, which testcase groups the testcases belong to, etc.

In addition, after filtering out the testcases, the testcase management unit may also sort the filtered testcases based on a predetermined priority, and then execute the target program according to the filtered testcases in a sorted sequence. For example, the filtered testcases may be sorted according to a priority in which a return value>execution time>return data>state of the test target>association of the testcases obtained by executing the target program based on the testcases, wherein the return value, the execution time, the return data, the state of the test target, and the association of the testcases may be the return value, the execution time, the return data, the state of the test target, and the association of the testcases obtained by executing the target program based on testcases previously.

In addition, the path management unit 420 may determine whether a second execution path having the same execution result as the first execution path is present in the path library. If there is a second execution path having the same execution result as the first execution path, path management unit 420 may determine whether the generated testcase has an association relationship with testcases corresponding to the second execution path based on the testcase relationship table and the path library. If there is no association relationship, the path management unit 420 may determine the first execution path as a new path. Here, the path library may include testcases corresponding to each path. For example, a correspondence relationship between testcases and paths may be recorded in the path library in forms of mask ranges, orphan values, etc.

In addition, for example, the path management unit 420 may further determine the first execution path as a new path when the return value is a new value, when the return value is not a new value, and based on the execution time. For example, the path management unit 420 may determine whether the execution time falls into a new time period. The time may be divided into slices to generate multiple time periods. Testcases that provide a return value that is not a new value but within different time periods may belong to different paths. Thus, whether the testcases belong to different paths may be determined through time. For a certain time period, if any execution time falls into this certain time period, this certain time period may be marked to indicate that there is already a testcase under this return value whose execution time falls into this time period. A return value may have multiple time periods, where some of time periods may be marked, and the rest of the time periods may not be marked. No mark means that no testcase generates this return value and the execution time falls into this time period. When the execution time of the first execution path falls into a new time period, the first execution path may be determined as a new path. When the execution time does not fall into a new time period, it may be determined whether the return data is new data. When the return data is new data, the first execution path may be determined as a new path. When the return data is not new data, it may be determined whether a state of the target program is a new state. For example, the state could be a state of an SSD (such as initialized, hibernated, connected, ready, working, etc.), a state of a smart-log (such as, overheating, read-only state, low capacity, power-off protection, etc.), etc. When the state of the test target is a new state, the first execution path may be determined as a new path. When the state of the test target is not a new state, it may be determined whether the generated testcase has an association relationship with testcases corresponding to the first execution path, and when the generated testcase does not have an association relationship with the testcases corresponding to the first execution path, it may be determined that the first execution path is a new path.

The path management unit 420 may determine whether the generated testcase has an association relationship with the testcases corresponding to the first execution path through the following operations: determining whether the testcase and other testcases corresponding to the first execution path belong to the same testcase group; determining the first execution path as new path when the testcase and the other testcases corresponding to the first execution path do not belong to the same testcase group; when the testcase and the other testcases corresponding to the first execution path belong to the same testcase group, determining whether the testcase and testcases in different testcase groups belong to the first execution path jointly; determine the first execution path as a new path when the testcase and the testcases in different testcase groups belong to the first execution path jointly. New testcases generated based on the same testcase may be divided into one testcase group.

For example, the path management unit 420 may determine the first execution path as a new path if the execution result satisfies any one of the following conditions: the return value is a new value; the return value is not a new value, and the execution time falls into a new time period; the return value is not a new value, the execution time does not fall into a new time period, and the return data is new data; the return value is not a new value, the execution time does not fall into a new time period, the return data is not new data, and the state of the test target is a new state; and the return value is not a new value, the execution time does not fall into a new time period, the return data is not new data, the state of the test target is not a new state, and the generated testcase does not have an association relationship with testcases corresponding to the first execution path. In addition to the above situations, the path management unit 420 may determine the testcase not to generate a new path.

Here, the path management unit 420 may further include a path management table for recording the corresponding relationship between paths and path groups, wherein mutually transferable paths are divided into one path group. Correspondingly, the path management unit 420 may determine whether the testcase and testcases in different testcase groups belong to the first execution path jointly based on the testcase association management table and the path management table.

In addition, the path management unit 420 may determine whether the testcase and other testcases corresponding to the first execution path belong to the same testcase group based on the testcase association management table and may determine whether the testcase and the testcases in different testcase groups belong to the same current path based on the testcase association management table and the testcase and path mapping table.

In addition, the testcase generation unit may further be configured to, if the first execution path it not a new path, determine whether the generated testcase is a testcase generated after being mutated for a preset number of times, and if the preset number of times is not reached, mutate the generated testcase to generate new testcases for testing the target program. When the predetermined number of testcases in a testcase group cannot be mutated, the testcase generation unit may also abandon the testcase group, and use the next testcase group to perform black-box fuzzing testing.

In addition, the testcase execution unit 410 may use the new testcases to execute the target program and repeat the process of generating new testcases together with the testcase generation unit and the path management unit 420 until no new testcase can generate a new path.

In addition, according to an exemplary embodiment of the present disclosure, there may also provide an electronic device, including a memory on which computer executable instructions are stored and a processor executing the previous method when the instructions are executed by the processor.

In addition, according to an exemplary embodiment of the present disclosure, there may also provide a computer-readable medium on which computer executable instructions are stored and executing the previous method when the instructions are executed.

According to an exemplary embodiment of the present disclosure, generation of new testcases may be guided based on whether the testcase generates a new path, which avoids occurrence of a situation of a large number of redundant testcases caused by random generation of testcases, and increase a code coverage at the same time. The code coverage of the test target may be determined based on the total number of paths of the current test target and the number of new paths that have been discovered. In addition, embodiments of the present disclosure may also be applied to black-box fuzzing testing of SSD firmware.

Although the present disclosure has been illustrated and described with reference to specific exemplary embodiments, it will be understood by those skilled in the art that various changes in form and details may be made without departing from the spirit and scope of the present disclosure as defined by the claims and the equivalents thereof.

13

14

What is claimed is:

1. A method for assessing code coverage of black-box fuzzing testing, the method comprising:

generating, by a processor, a plurality of testcases;

executing, by the processor, a computer-executable target program based on each of the generated testcases to obtain a plurality of execution result;

determining, by the processor, whether a first execution path among a plurality of execution paths of the target program associated with a given testcase is a new execution path based on previously recorded execution paths in a path library;

in response to a determination that the first execution path is not a new execution path, randomly generating a new testcase;

in response to a determination that the first execution path is a new execution path, mutating the given testcase to generate new testcases for testing the target program and recording the first execution path in the path library;

determining, by the processor, a code coverage of the target program based on a number of paths recorded in the path library and a preset test path number; and performing redundancy filtering on the randomly generated new testcases prior to executing the target program, wherein the performing redundancy filtering removes at least one testcase based on predetermined conditions including the at least one testcase being different, the at least one testcase being complete, and the at least one testcase being evenly distributed.

2. The method of claim 1, wherein the determining whether the first execution path is a new execution path comprises: determining whether there is an execution path having the same execution result as the first execution path in the path library; and determining the first execution path as the new execution path if it is determined there is no execution path having the same execution result.

3. The method of claim 1, further comprising: recording an association relationship between the given testcase and the new testcases in a testcase relationship table.

4. The method of claim 3, wherein the path library further comprises testcases corresponding to each of the execution paths, and the determining whether the first execution path is a new execution path further comprises: determining whether there is a second execution path having the same execution result as the first execution path in the path library; determining whether the given testcase has an association relationship with testcases corresponding to the second execution path based on the testcase relationship table and the path library if it is determined that the second execution path has the same execution result as the first execution path; and determining the first execution path to be the new execution path when it is determined the given testcase has no association relationship.

5. The method of claim 3, further comprising: determining whether the given testcase has been mutated a preset number of times when it is determined that the first execution path is not a new execution path; and mutating the given testcase to generate the new testcases for testing the target program if it is determined that given testcase has not been mutated the preset number of times.

6. The method of claim 1, wherein the determining whether the first execution path is a new execution path comprises: determining the first execution path as a new execution path if one of: a) a return value of the execution result is a new value; b) the return value is not a new value, and an execution time of the execution result falls into a new time period; c) the return value is not a new value, the execution time does not fall into a new time period, and return data of the execution result is new data; d) the return value is not a new value, the execution time does not fall into a new time period, the return data is not new data, and a state of the target program is a new state; and e) the return value is not a new value, the execution time does not fall into a new time period, the return data is not new data, the state of the test target is not a new state, and the given testcase does not have an association relationship with testcases corresponding to the first execution path.

7. The method of claim 1, wherein the target program is solid state drive (SSD) firmware.

8. A black-box fuzzing testing apparatus, comprising:

a testcase execution unit configured to generate a plurality of testcases and execute a computer-executable target program based on the generated testcases to obtain a plurality of execution results;

a path management unit configured to determine whether a first execution path among a plurality of execution paths of the target program associated with a given testcase is a new execution path based on previously recorded execution paths in a path library, and record the first execution path in the path library;

a testcase generation unit configured to:

randomly generate a new testcase in response to a determination that the first execution path is not a new execution path, and mutate the given testcase to generate new testcases for testing the target program; and a feedback management unit configured to determine a code coverage of the target program based on a number of paths recorded in the path library and a preset test path number, wherein the testcase execution unit is further configured to perform redundancy filtering on the randomly generated new testcases prior to executing the target program, wherein the performing redundancy filtering removes at least one testcase based on predetermined conditions including the at least one testcase being different, the at least one testcase being complete, and the at least one testcase being evenly distributed.

9. The black-box fuzzing testing apparatus of claim 8, wherein the path management unit is further configured to: determine whether there is an execution path having the same execution result as the first execution path in the path library; and determine the first execution path as a new execution path if it is determined there is no execution path having the same execution result.

10. The black-box fuzzing testing apparatus of claim 8, further comprising: testcase management unit configured to record an association relationship between the given testcase and the new testcases in a testcase relationship table.

11. The black-box fuzzing testing apparatus of claim 10, wherein the path library further comprises testcases corresponding to each of the execution paths, and the path management unit is further configured to: determine whether there is a second execution path having the same execution result as the first execution path in the path library; determine whether the given testcase has an association relationship with testcases corresponding to the second execution path based on the testcase relationship table and the path library if it is determined that the second execution path has the same execution result as the first execution path; and determine the first execution path to be a new execution path when it is determined the given testcase has no association relationship.

12. The black-box fuzzing testing apparatus of claim 10, wherein the testcase generation unit is further configured to, determine whether the given testcase has been mutated a preset number of times when it is determined that the first execution path is not a new execution path; and mutate the given testcase to generate new testcases for testing the target program if it is determined that given testcase has not been mutated the preset number of times.

13. The black-box fuzzing testing apparatus of claim 8, wherein the path management unit is further configured to: determine the first execution path as a new execution path if one of: a) a return value of the execution result is a new value; b) the return value is not a new value, and an execution time of the execution result falls into a new time period; c) the return value is not a new value, the execution time does not fall into a new time period, and a return data of the execution result is new data; d) the return value is not a new value, the execution time does not fall into a new time period, the return data is not new data, and a state of the target program is a new state; and e) the return value is not a new value, the execution time does not fall into a new time period, the return data is not new data, the state of the test target is not a new state, and the generated testcase does not have an association relationship with testcases corresponding to the first execution path.

14. The black-box fuzzing testing apparatus of claim 8, wherein the target program is solid state drive (SSD) firmware.

15. A black-box fuzzing testing method, comprising:
generating, by a processor, a plurality of testcases;
executing, by a processor, a computer-executable target program based on each of the generated testcases to obtain a return value and an execution time for each of the generated testcases;
filtering out, by the processor, at least one of the generated testcases based on the return value and the execution time for each of the generated testcases to generate a subset of testcases, wherein filtering out the at least one of the generated testcases comprises removing at least one of the generated testcases by performing redundancy filtering prior to executing the target program; and
determining, by the processor, a code coverage of the target program based on the subset of testcases.

16. The black-box fuzzing testing method of claim 15, wherein the filtering comprises filtering out one of the generated testcases whose return value and execution time is the same as another one of the generated testcases.

* * * * *